US012753053B2

(12) United States Patent
Drake

(10) Patent No.: US 12,753,053 B2
(45) Date of Patent: Oct. 6, 2026

(54) JACK WITH HYDRAULIC LOCK

(71) Applicant: Pacific Rim International, LLC, Vancouver, WA (US)

(72) Inventor: Frank Drake, Wausau, WI (US)

(73) Assignee: Pacific Rim International, LLC, Vancouver, WA (US)

( * ) Notice: Subject to any disclaimer, the term of this patent is extended or adjusted under 35 U.S.C. 154(b) by 471 days.

(21) Appl. No.: 18/132,916

(22) Filed: Apr. 10, 2023

(65) Prior Publication Data

US 2024/0336458 A1 Oct. 10, 2024

(51) Int. Cl.

| | |
|---|---|
| ***B66F 3/30*** | (2006.01) |
| ***B60D 1/66*** | (2006.01) |
| ***B60S 9/12*** | (2006.01) |
| ***F15B 11/00*** | (2006.01) |
| ***F15B 13/01*** | (2006.01) |
| ***F15B 15/20*** | (2006.01) |

(52) U.S. Cl.

CPC .................. *B66F 3/30* (2013.01); *B60D 1/66* (2013.01); *B60S 9/12* (2013.01); *F15B 11/003* (2013.01); *F15B 13/01* (2013.01); *F15B 15/202* (2013.01)

(58) Field of Classification Search

CPC ...... B60S 9/10; B60S 9/12; B60S 9/20; B66F 3/24–28; B66F 3/30; B66F 5/04; B66F 7/08; B66F 7/085; F15B 13/0401; F15B 15/1428

See application file for complete search history.

(56) References Cited

U.S. PATENT DOCUMENTS

2004/0112208 A1* 6/2004 Kot, II .................... F15B 13/01 91/420
2005/0140100 A1* 6/2005 Peter .......................... B60S 9/12 280/6.153

FOREIGN PATENT DOCUMENTS

KR 20130005041 U * 8/2013 ................ B60S 9/12

OTHER PUBLICATIONS

Youngju Seo—KR 20130005041U—Original Patent and Machine Translation (Year: 2013).*
KR-20130005041U. Machine Translation of Description (Year: 2013).*
Sun Hydraulics, Model CKCB, pilot-to-open check valve with standard pilot, 2019, 2 pages.

(Continued)

*Primary Examiner* — Tyrone V Hall, Jr.
(74) *Attorney, Agent, or Firm* — McDonald Hopkins LLC

(57) ABSTRACT

A hydraulic jack configured to be attached to a trailer and operable with a hydraulic power unit having an extend line and a retract line. The hydraulic jack may include a working cylinder and a valve body coupled to the working cylinder. The valve body may provide for a locking valve to be installed within the valve body and include a pilot port. The locking valve may be operable to allow substantially free hydraulic fluid flow in a first direction from the extend coupler to the working cylinder. The locking valve may be further operable, under control of the pilot port, to allow substantially free hydraulic fluid flow in a second direction from the working cylinder to the extend coupler when hydraulic pressure is present at the pilot port and to substantially prevent hydraulic fluid flow in the second direction from the working cylinder to the extend coupler when hydraulic pressure is not present at the pilot port.

12 Claims, 4 Drawing Sheets

(56) References Cited

OTHER PUBLICATIONS

Premium Supply, EZ Lifter Retrofit Hydraulic Jacks, Jack ZJC Models, Operator's Manual and Installation Instructions, Greenville, Texas, Oct. 15, 2020, 21 pages.
Stillwell, online catalog including the Cube, 2021, 7 pages.
Sun Hydraulics, Model CBBGX, fixed setting valve, 4.5:1 pilot ratio, restrictive counterbalance valve, 2021, 2 pages.

* cited by examiner

JACK WITH HYDRAULIC LOCK

BACKGROUND

This disclosure relates in general to a device and components for use as a jack to be installed on a trailer to adjust the height of the trailer, typically at a forward end of the trailer. The jack is particularly suited to applications for a hydraulic jack where maintaining the jack's height is important in the case of loss of hydraulic pressure. More specifically, this disclosure relates to a structural design that incorporates into the working cylinder of the jack the mechanism for preventing an unexpected hydraulic jack collapse. This arrangement protects against collapse in the event of a failure of any hydraulic line, control valve, or component located outside the working cylinder. The disclosure also relates to a method of construction for the mechanism for preventing collapse.

Jacks for use with trailers have previously used the following methods to combat the problem of loss of hydraulic pressure, but all of these have drawbacks, where, in a worst case, a failure of hydraulic components results in an immediate collapse of the jack causing significant damage/injury or, in a best case, the jack drifts down to the collapsed state more slowly, which still may cause significant damage/injury:

a. relying on the hydraulic control valve to retain hydraulic fluid within the working cylinder. However, in the event of a hydraulic line failure between the control valve and the working cylinder the jack still collapses;
b. a holding or locking device, such as "The Cube" made by Stillwell of Burnsville, MN, located midway between the hydraulic control valve and the working cylinder or cylinders. Such a device still leaves the system at risk because components between the midway device and the working cylinder(s) are vulnerable;
c. a flow-restricting device within the system, for example, integral with the working cylinder. However, a flow-restricting device, while slowing the collapse of the working cylinder does not prevent a collapse.

An improved jack would incorporate a capacity for maintaining height despite a failure anywhere along the hydraulic lines. The maintenance of height would be not merely a reduction in the rate at which the jack collapses but preventing the collapse altogether. A problem that is not even recognized, much less solved in the prior art is how to incorporate the collapse-prevention mechanism into the jack body with a robust yet economical structure. The improved jack would be effectively non-collapsible with zero drift-down despite the hydraulic failure.

SUMMARY

According to an aspect of the present disclosure, a jack for use with a trailer may be configured to be attached to the trailer and operable for extending and retracting to an adjustable height for stabilizing the trailer. The hydraulic jack may be configured for use with a hydraulic power unit having an extend line and a retract line and may include a working cylinder defining a body, an extend port and a retract port. The jack may further include a cylinder rod coupled to the working cylinder, and a foot coupled to the cylinder rod, the cylinder rod and foot operable to extend and retract relative to the working cylinder body to provide the adjustable height for stabilizing the trailer. The jack may also include a valve body coupled to the working cylinder, and the valve body may include an extend coupler and a retract coupler configured for respective connection to the extend and retract lines of the hydraulic power unit. The valve body may further include a first port coupled to the extend port of the working cylinder, a first internal cavity interconnecting the extend coupler and the first port, a second port coupled to the retract port of the working cylinder, a second internal cavity interconnecting the retract coupler and the second port, and a third internal cavity interconnecting the second internal cavity and the first internal cavity. The valve body may also include a locking valve installed in the first internal cavity of the valve body, the locking valve including a pilot port coupled to the third internal cavity of the valve body and therethrough to the second internal cavity and the retract coupler of the valve body. The locking valve may be operable to allow substantially free hydraulic fluid flow through the first internal cavity in a first direction from the extend coupler to the first port. The locking valve may be further operable, under control of the pilot port to allow substantially free hydraulic fluid flow in a second direction from the first port to the extend coupler when hydraulic pressure is present at the pilot port and to substantially prevent hydraulic fluid flow in the second direction from the first port to the extend coupler when hydraulic pressure is not present at the pilot port.

The valve body may be coupled by welding to the working cylinder. The jack may further comprise a housing wherein the working cylinder body is installed within the housing and further wherein the housing is configured to be attached to the trailer for stabilizing the trailer. The valve body may be installed within the housing. The valve body may include a solid metal body with the internal cavities formed by drilling therein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference number or the same number with a letter suffix.

DETAILED DESCRIPTION

The following detailed description of some exemplary embodiments of the present disclosure do not limit the scope, applicability, or configuration of the other embodiments that will be understood from the present disclosure. The ensuing description will provide those skilled in the art with an enabling description not only for the exemplary embodiment but also other embodiments within the scope of the present disclosure. It is understood that various changes may be made in the function and arrangement of elements without departing from the spirit and scope as set implementing forth in the appended claims.

Figure 1:
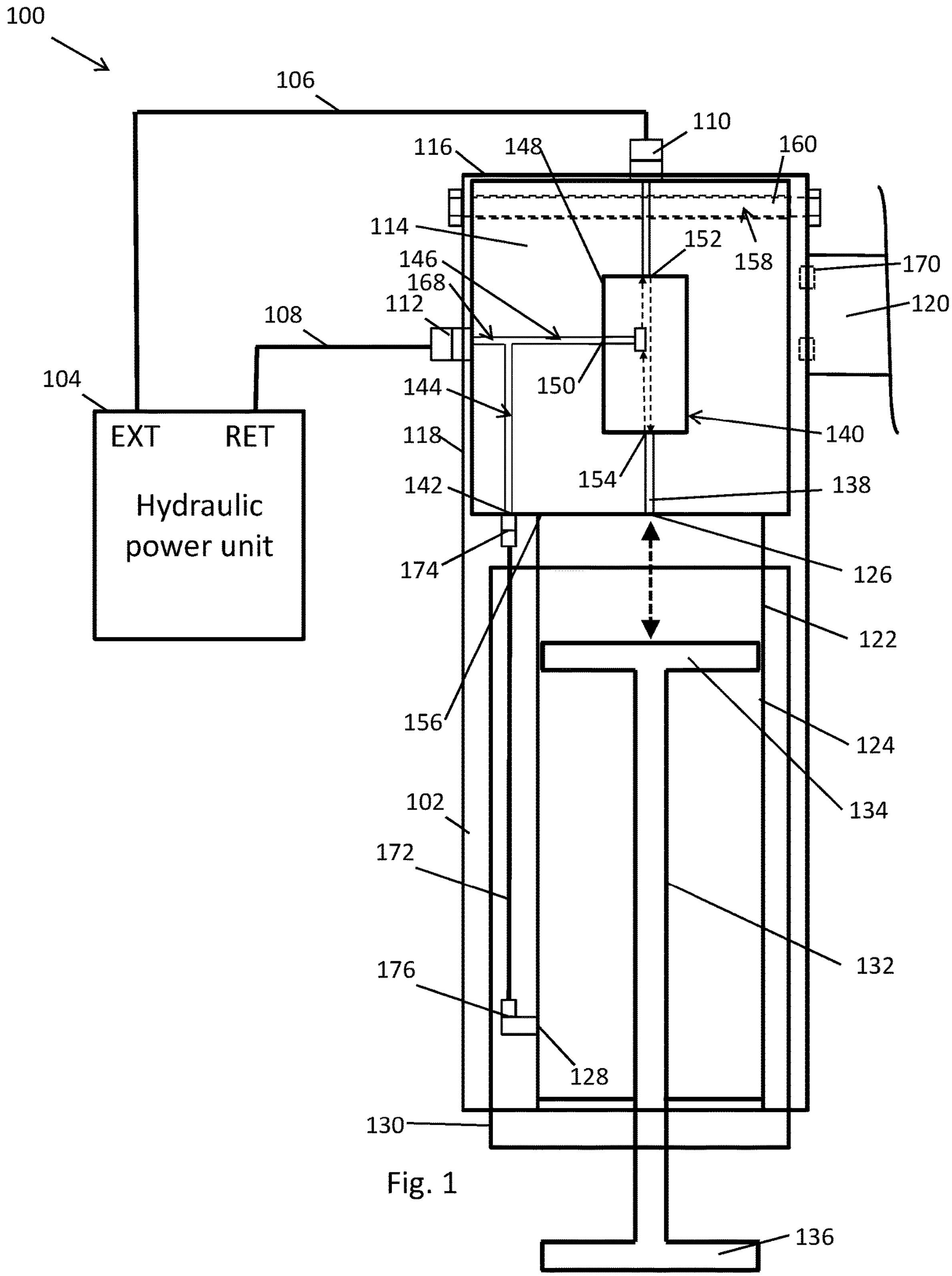
FIG. 1 is a schematic and structural diagram showing an example of a jack for use with a trailer including a portion that rests on the ground and a relatively movable portion with a jack housing to be coupled to the structure of the trailer, and showing a hydraulic power unit with retract and extend lines coupled to the jack, within which the extend line is connected to a locking valve that, in the extend direction, always allows fluid flow to the extend side of a working cylinder and that, in the retract direction, only allows fluid flow when a pilot line, connected to the retract line, is pressurized.
Figure 2:
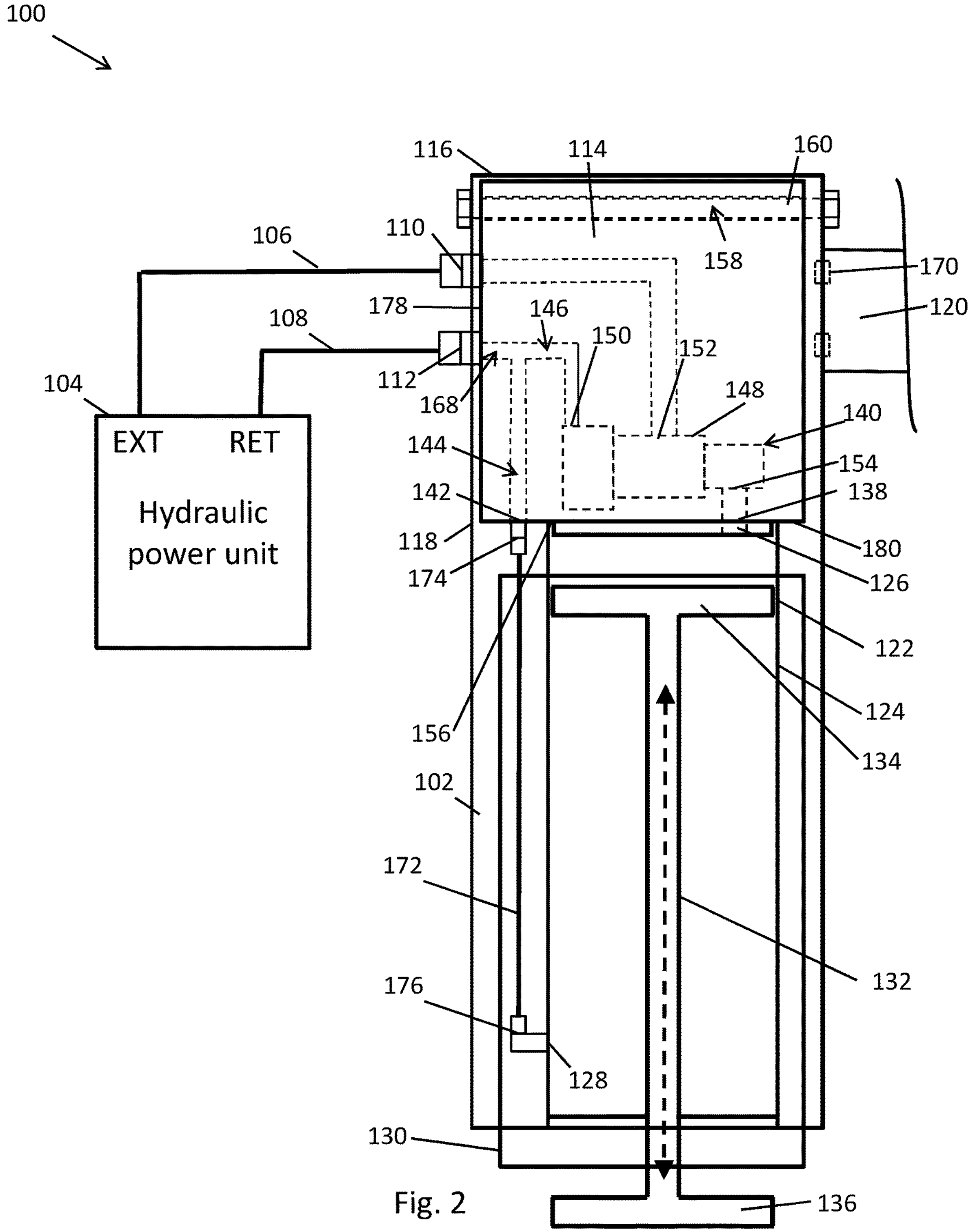
FIG. 2 is a similar diagram to FIG. 1, showing, in dashed outline, an example structure for the locking valve within a valve body that provides the physical connections of the retract and extend lines to the locking valve and to the working cylinder.

As shown in FIGS. 1-2, a hydraulic jack system, indicated generally at 100, may include a hydraulic jack 102 and a hydraulic power unit (HPU) 104 capable of providing power through hydraulic lines, including an extend line 106 and a retract line 108. A pair of couplers 110, 112 may provide connection of extend line 106 and retract line 108 to a valve body 114 that may be within a jack housing 116.

Jack housing 116 includes a first portion 118 of jack 102 that, in use, is attached to a trailer 120 and substantially fixed relative to the trailer. Jack housing 116 may include a second, internal portion 130, a working cylinder 122 with a body 124, an extend port 126, and a retract port 128, all of which may be contained within jack housing 116.

Internal portion 130 of jack 102 may be movable relative to first portion 118. Internal portion 130 may include a cylinder rod 132, operatively coupled to working cylinder 122. Cylinder rod 132 may include a piston 134 adjacent one end and a foot 136 adjacent the other end. Piston 134 may be operable with the cylinder to move up and down in reaction to the hydraulic fluid entering/leaving the extend and retract ports. This arrangement provides for cylinder rod 132, foot 136, and internal portion 130 to be operable to extend and retract relative to working cylinder body 124 to provide an adjustable height for stabilizing trailer 120.

Hydraulic power unit 104 typically is capable of producing a hydraulic pressure to provide hydraulic fluid flow, under control of one or more up/down and/or other switches and controls as suited to the particular application, through extend line 106 and retract line 108 to valve body 114 via couplers 110, 112. Valve body 114 operatively couples the hydraulic flow to the working cylinder to provide holding capability for the jack.

For example, valve body 114 may include a first port 138 coupled to extend port 126 of the working cylinder and a first internal cavity 140 interconnecting extend coupler 110 and first port 138. Valve body 114 may include a second port 142 coupled to retract port 128 of the working cylinder and a second internal cavity 144 interconnecting coupler 112 of retract line 108 and second port 142 to provide hydraulic fluid for retracting working cylinder 122. Valve body 114 may include a third internal cavity 146 interconnecting second internal cavity 144 and first internal cavity 140 for operation that will be further described below.

Valve body 114 may further include a holding valve, such as locking valve 148 installed in first internal cavity 140. Typically, locking valve 148 is installed in, and coupled through valve body 114 to hydraulic power unit 104, to provide for jack 102 to extend against the force of gravity when hydraulic extend power is applied and to resist gravity except in the case where hydraulic retract power is applied.

Locking valve 148 may be of any manufacture suitable to a particular application, such as the CBBGX model or CKCB model or CBCA-LHN model made by Sun Hydraulics. Locking valve 148 may include a pilot port 150 and two operational ports 152, 154. Locking valve may allow substantially free flow of fluid through operational ports 152, 154 in a first direction from port 152 to port 154, while allowing flow in a second, opposite direction from port 154 to port 152 only when pilot port 150 is pressurized.

Locking valve 148 may be installed in first internal cavity 140 so that pilot port 150 is coupled to third internal cavity 146 of valve body 114. Locking valve 148 may further be situated in first internal cavity 140 so that fluid flow to/from extend line 106 passes through operational ports 152, 154. Locking valve 148 may thus be operable to allow substantially free hydraulic fluid flow through first internal cavity 140 in the first direction from extend coupler 110 to first port 138. Locking valve 148 may further be operable, under control of pilot port 150, to allow substantially free hydraulic fluid flow in the second direction from first port 138 to extend coupler 110 when hydraulic pressure is present at pilot port 150. Locking valve 148 may also be operable to substantially prevent hydraulic fluid flow in the second direction from first port 138 to extend coupler 110 when hydraulic pressure is not present at the pilot port.

The effect of the just-described configuration is that hydraulic fluid flows out of the extend side of the working cylinder only when the hydraulic power unit is directing a retract operation by providing pressure and fluid flow through the retract line, which is generally only the case when the controls of the hydraulic power unit are set to retract and the unit is properly powered and operating. If, on the other hand, the hydraulic power unit has lost power, or a hydraulic line has developed a failure, such as a leak, then flow/pressure to retract will not be present and the locking valve's pilot port will not be active, thus preventing fluid flow out of the extend side of the working cylinder. Under these conditions, the jack will remain at its trailer-stabilizing height despite the failure elsewhere in the hydraulic system. Locking valve 148 may be selected for capabilities that, under expected loading conditions but with a hydraulic power or line failure, the jack is effectively non-collapsible with zero drift down.

Valve body 114 may be coupled to working cylinder 122 by any suitable means such as by welding at a junction 156. Valve body 114 may be made by any suitable means, such as by using a solid metal body of suitable shape and material, such as a rectangular prism about 4-inches by about 4-inches by about 2.7 inches of CF 1018 steel. Valve body 114 may further include a fourth cavity 158 configured to receive a mounting pin 160 to secure valve body 114 to jack housing 116. The internal cavities in valve body 114 may be formed by drilling multiple holes in the solid metal body. Jack housing 116 may be secured to trailer 120 by any suitable means, such as mounting bolts 170.

Typically, jack housing 116 also houses a line 172 that connects second port 142 of valve body 114 with retract port 128 of working cylinder 122. For example, line 172 may be a metal tube with appropriate couplers 174, 176 at each end for fastening to valve body 114 and to working cylinder 122 at their respective ports.

FIG. 1 provides a schematic representation of valve body 114 and locking valve 148 to depict functional operation of the jack. FIG. 2 provides a representation that is more structural and closer to the examples of valve body 114 and locking valve 148 that will be described for FIGS. 3-5. In particular, FIG. 2 shows locking valve 148 in a characteristic shape, and shows the retract and extend couplers 110, 112 on a first side 178 of valve body 114, and the first and second ports 138, 142 that couple to the extend and retract ports 126, 128 of working cylinder 122 on a second side 180 of valve body 114, which, in operation, is the bottom side of valve body 114.

Figure 3:
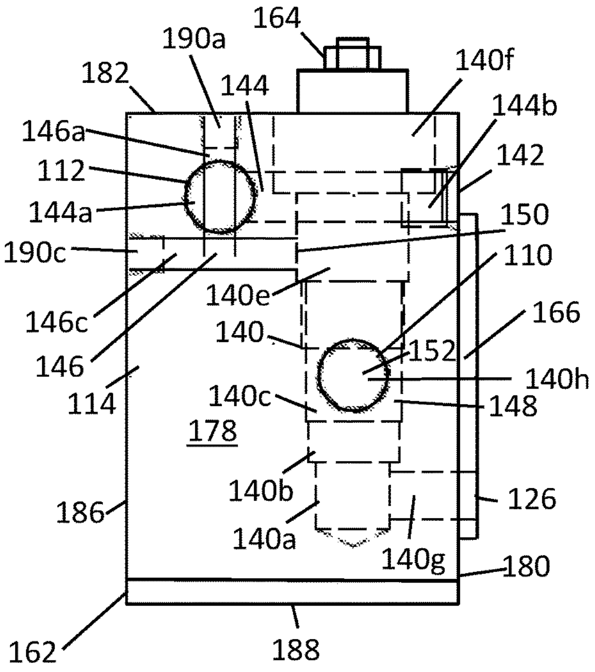
FIG. 3 is schematic diagram of an embodiment of the valve body formed of a solid metal block with the internal cavities for the locking valve, the extend and retract lines, and the pilot line formed by drilling holes in the block, the block shown from a first side where the extend and retract couplers are located with a second side on the right and a third side on the top.
Figure 4:
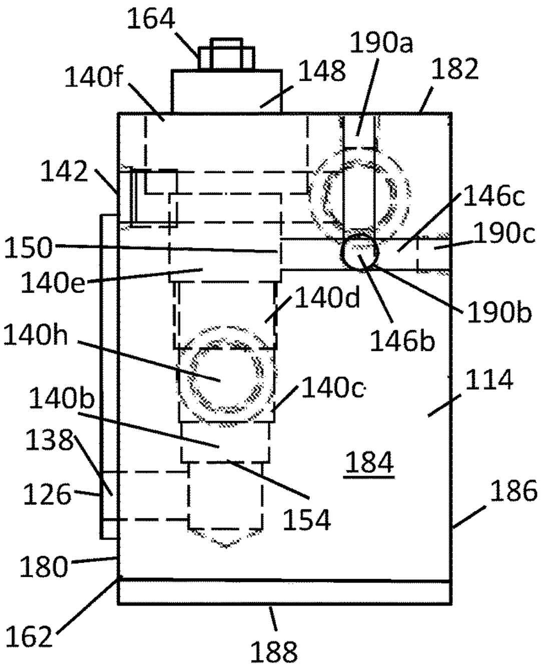
FIG. 4 is a schematic diagram of the valve body of FIG. 3 shown from a fourth side, which is the opposite side as compared to FIG. 3, the fourth side being the location where one of a set of three holes are drilled and then capped to provide a portion of an internal cavity that connects the retract line to the pilot line on the locking valve, with the second side on the left and a fifth side on the right.
Figure 5:
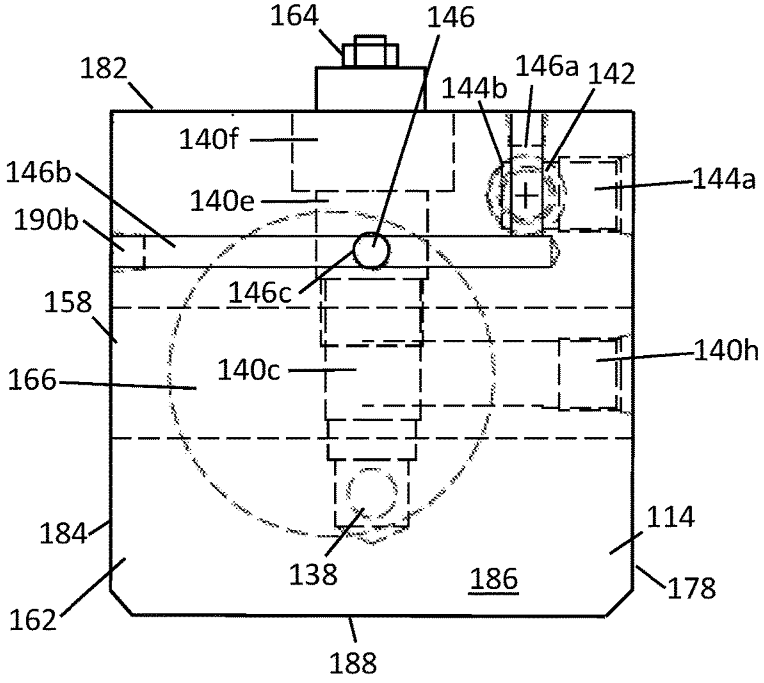
FIG. 5 is a schematic diagram of the valve body of FIGS. 3 and 4 shown from the fifth side where another one of the set of the three holes are drilled and then capped to provide another portion of the internal cavity that connects the retract line to the pilot line on the locking valve, and the third hole is shown extending from the top or third side. The sixth side is shown on the bottom in each of FIGS. 3-5.

FIGS. 3, 4, and 5 show three different views of an example of valve body 114, in this embodiment formed of a solid metal block 162 with holes drilled therein to create the internal cavities. FIG. 3 shows first side 178 facing the viewer, with second side 180 to the right and a third side 182 on top. FIG. 4 shows a fourth side 184 facing the viewer, opposite first side 178, with second side 180 to the left, and a fifth side 186 to the right. FIG. 5 shows fifth side 186 facing the viewer. All of FIGS. 3-5 have third side 182 on the top and a sixth side 188 on the bottom.

First internal cavity 140, which receives locking valve 148, may be formed at least in part by one or more drilling operations started from third side 182. For example, six concentric holes, forming a set of hole portions 140*a-f*, may be drilled or otherwise formed with successively larger diameters to provide a portion of cavity 140 with a shape corresponding to a profile of locking valve 148 to be inserted therein. Locking valve 148 may include a portion 164 that may extend out of block 162. For example, portion 164 may provide for adjustment of the operational pressures of locking valve 148, e.g., with the CBCA-LHN model.

Another hole 140*g* may be provided from second side 180 to hole portion 140*a* to provide cavity 140 with a conduit to first port 138 and extend port 126, thus connecting operational port 154 of locking valve 148 with extend port 126. Operational port 154 is typically located adjacent hole portion 140*b*. Another hole 140*h* may be provided from first side 178 to hole portion 140*c* to provide cavity 140 with a conduit for the extend fluid going into valve body 114 from extend coupler 110 to operational port 152 of locking valve 148, which is typically located in hole portion 140*c*. Pilot port 150 is typically located in hole portion 140*e*.

In addition to holes 140*a-h* to provide cavity 140 for locking valve 148 and its connection to extend port 126, further holes may be drilled or otherwise formed to provide conduits for the retract fluid going into and out of valve body 114 and for an internal connection of the retract fluid pressure to pilot port 150 of locking valve 148. Internal cavity 144 may formed by drilling two holes 144*a*, 144*b* that connect at right angles. Hole 144*a* may be started from first side 178 and have proper alignment and sufficient depth so that its distal end meets the distal end of hole 144*b*, which is started from second side 180. Thus second internal cavity 144 connects retract coupler 112 with second port 142, which connects through line 172 (FIGS. 1 and 2) to retract port 128 on working cylinder 122.

Third internal cavity 146, which provides the interconnection of the hydraulic fluid pressure within valve body 114 from second internal cavity 144 to first internal cavity 140, may be formed by drilling three holes 146*a*, 146*b*, 146*c* in block 162 and by then applying caps 190*a*, 190*b*, 190*c* to each of the holes to seal off internal cavity 146 from outside valve body 114. Holes 146*a*, 146*b*, 146*c* may each be drilled from a different side of block 162, each at right angles to both of the others. Holes 146*a*, 146*b*, 146*c* may be drilled with appropriate alignment and depth to form third internal cavity 146 as follows:

a. hole 146*a* is drilled from third side 182 and extends perpendicularly through hole 144*b* and beyond to a sufficient depth to align with hole portion 140*e* where pilot port 150 of locking valve 148 may be located;
b. hole 146*b* is drilled from fourth side 184, aligned so that it crosses over hole portion 140*e* and with sufficient depth so that its distal end meets the distal end of hole 146*a*; and
c. hole 146*c* is drilled from fifth side 186 to pass through hole 146*b* with sufficient depth to reach hole portion 140*e* thus connecting the hydraulic retract fluid pressure to pilot port 150 of locking valve 148.

Figure 7:
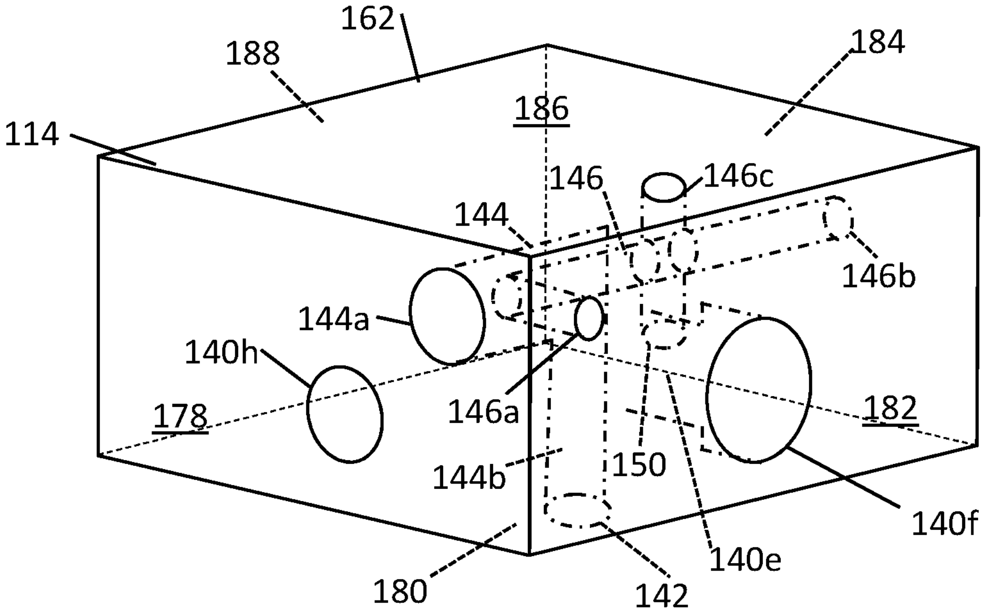
FIG. 7 is an isometric view of the block that provides the valve body, showing a portion of the internal cavities, in particular all of the internal cavity that connects the retract fluid pressure to the pilot port of the locking valve.

FIG. 7 provides an isometric view of how third internal cavity 146 may be constructed by drilling three holes 146*a*, 146*b*, 146*c* to interconnect the hydraulic retract fluid pressure within valve body 114 from second internal cavity 144 to first internal cavity 140, in particular at hole 140*e* where the pilot port 150 of the locking valve may be located. As described above, retract coupler 112 may connect to second internal cavity 144 at hole 144*a* on first side 178 of valve body 144. Second internal cavity 144 extends through hole 144*b* to second port 142 at second side 180 of valve body 114 to provide retract fluid to the working cylinder.

To form internal cavity 146, hole 146*a* may be drilled from third side 182 to extend perpendicularly through hole 144*b*. Hole 146*a* may extend all the way through and beyond to an internal end where it may meet an internal end of hole 146*b*. Hole 146*b* may be drilled from fourth side 184, and may be aligned so that it crosses over hole portion 140*e* and with sufficient depth to connect to hole 146*a*. Hole 146*c* may be drilled from fifth side 186 to pass through hole 146*b* with sufficient depth to reach hole portion 140*e* of first internal cavity 140 at the location of pilot port 150 of the locking valve. Thus holes 146*a*, 146*b*, and 146*c* combine to connect the hydraulic retract fluid pressure to pilot port 150 of the locking valve. Third internal cavity 146 may be sealed off from the valve body's outer surfaces by applying, as described above, caps 190*a*, 190*b*, 190*c* to each of holes 146*a*, 146*b*, and 146*c*. Locking valve 148, when installed in valve body 114, may be effectively protected from damage and thereby provides its function to make the jack non-collapsible with zero drift down even in the case of a hydraulic failure elsewhere.

Valve body 114 may include a raised circle 166 on second side 180 to aid in the structural connection to working cylinder body 124. As seen in FIG. 5, raised portion 166 may be circular and sized to mate with working cylinder 122. Raised portion 166 may provide a location for welding valve body 114 to working cylinder 122 at junction 156 (see FIG. 2). First port 138 connects to extend port 126 within the circle defined by raised portion 166 for providing hydraulic fluid under pressure into working cylinder 122 to extend cylinder rod 132.

Figure 6:
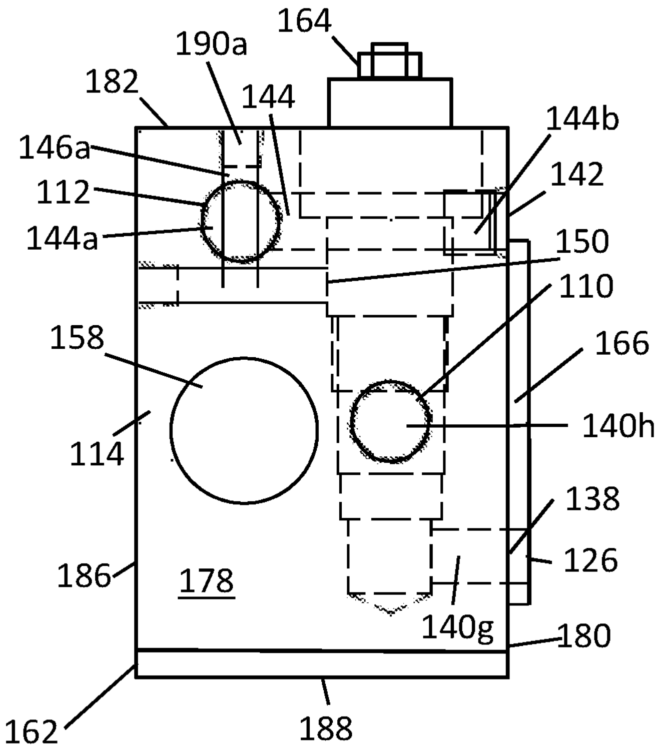
FIG. 6 is the same as FIG. 3, additionally showing a mounting cavity in the valve body to be connected by a mounting pin to the jack housing, which cavity was not illustrated in FIGS. 3 and 4 to provide for clarity of other features of the valve body.

Fourth cavity 158 is shown schematically in FIGS. 1 and 2 and in FIG. 5 is shown at a potential size and location for receiving mounting pin 160. FIG. 6, which is otherwise the same as the view of FIG. 3, is provided to illustrate further the potential size and location of fourth cavity 158.

One or more embodiments of the present disclosure provide that the holding or locking valve be integral with the working hydraulic cylinder, for example by being welded to, or threaded into, or otherwise directly ported into, the base end of the working cylinder. It will be understood that this integral structure is located within the structural tubes, jack bodies, or other linear guidance of the trailer jack. Such holding or locking valve prevents the collapse of the working cylinder without regard to the integrity of the any of the upstream (between the control valve and working cylinder) hydraulic components such as hydraulic tube lines, hoses, valves, or other hydraulic circuitry.

In these embodiments, the locking valve allows the hydraulic fluid to freely flow into the base end of the working cylinder thus extending and lifting the load. The fluid is then trapped in the working cylinder with no escape path unless the pilot signal is pressurized to intentionally retract the working cylinder. The system of such embodiments contains no soft (nonmetallic) or vulnerable or exposed hydraulic lines between the trapped fluid and the outside world thus safely and assuredly holding the load. In one or more embodiments, the retract or rod end hydraulic feed line is also the pilot line and is a metallic tube connecting the rod end to the valve body. All of the above mentioned components are protected inside the tubes or linear guidance system of the hydraulic jack.

The hydraulic jack of the present disclosure may be used to support, for example, a trailer tongue. The integral hydraulic valve may be robustly and directly connected to the base end of the working cylinder and does not depend on hydraulic hoses, tube lines, or other components while trapping the base end hydraulic fluid which supports the load.

In one or more embodiments the base end structure of the working cylinder becomes the housing for the integral hydraulic locking valve as well as the load bearing location for the working cylinder mounting pin. This base end cover may also be the hydraulic conduit for both the base and rod end hydraulic fluid.

While the principles of the disclosure have been described above in connection with specific apparatuses and methods, it is to be clearly understood that this description is made only by way of example and not as limitation on the scope of the disclosure.

What is claimed is:

1. A hydraulic jack for use with a trailer, the hydraulic jack configured to be attached to the trailer and operable for extending and retracting to an adjustable height, the hydraulic jack comprising:

a hydraulic power unit having an extend line and a retract line, the hydraulic power unit capable of producing a hydraulic pressure to provide hydraulic fluid flow through the extend line and the retract line;

a working cylinder defining a body, an extend port and a retract port;

an internal portion comprising a cylinder rod, the internal portion coupled to the working cylinder, and the internal portion further comprising a foot coupled to the cylinder rod, the internal portion, cylinder rod, and foot operable to extend and retract relative to the working cylinder body to provide the adjustable height for stabilizing the trailer;

a valve body coupled to the working cylinder, the valve body being coupled by welding to the working cylinder and comprising a solid metal body defining a plurality of intersecting drilled bores sealed by caps, the valve body comprising an extend coupler and a retract coupler configured for respective connection to the extend and retract lines of the hydraulic power unit, the valve body further comprising:

a first port coupled to the extend port of the working cylinder and a first internal cavity interconnecting the extend coupler and the first port;

a second port coupled to the retract port of the working cylinder and a second internal cavity interconnecting the retract coupler and the second port, and a third internal cavity interconnecting the second internal cavity and the first internal cavity, a locking valve installed in the first internal cavity of the valve body, the locking valve comprising a pilot port coupled to the third internal cavity of the valve body and therethrough to the second internal cavity and the retract coupler of the valve body, the locking valve operable to allow substantially free hydraulic fluid flow through the first internal cavity in a first direction from the extend coupler to the first port, the locking valve further operable, under control of the pilot port:

to allow substantially free hydraulic fluid flow in a second direction from the first port to the extend coupler when hydraulic pressure is present at the pilot port; and to substantially prevent hydraulic fluid flow in the second direction from the first port to the extend coupler when hydraulic pressure is not present at the pilot port, and wherein the valve body is integral with the working cylinder such that all hydraulic connections between the locking valve and the working cylinder are internal to the valve body; and a housing wherein the working cylinder body and the valve body are installed within the housing and further wherein the housing is coupled to the trailer by welding or bolting for stabilizing the trailer;

a mounting pin for attaching the working cylinder to the housing of the jack, and wherein the valve body includes a fourth cavity configured to receive the mounting pin to secure the valve body to the housing of the jack;

an outer and inner mechanical tube to substantially contain and shield the working cylinder and facilitate attachment to the trailer.

2. The hydraulic jack of claim 1 further comprising a retract line between the second port and the retract port, wherein the retract line comprises a metallic tube housed entirely within the housing.

3. The hydraulic jack of claim 1 further comprising an outer and inner mechanical tube to substantially contain and shield the working cylinder and facilitate attachment to the trailer.

4. A hydraulic jack comprising:

a working cylinder defining a body;

a cylinder rod engaged with the working cylinder to extend and retract relative to the body, wherein the cylinder rod comprises a foot configured to stabilize a trailer;

a housing configured to be attached to a trailer, the working cylinder installed within the housing, wherein the housing of the jack is coupled to the trailer by welding or bolting;

a valve body coupled to the working cylinder and positioned within the housing, the valve body being coupled by welding to the working cylinder and comprising a solid metal body with internal cavities formed by drilling therein;

further comprising a mounting pin for attaching the working cylinder to the housing of the jack, and wherein the valve body includes a fourth cavity configured to receive the mounting pin to secure the valve body to the housing of the jack;

an outer and inner mechanical tube to substantially contain and shield the working cylinder and facilitate attachment to a trailer;

a locking valve positioned in the working cylinder, the locking valve operable to allow substantially free hydraulic fluid flow in a first direction when hydraulic pressure is present at an extend line, and to substantially prevent hydraulic fluid flow in a second direction when hydraulic pressure is not present at a retract line, wherein the working cylinder encapsulates the extend and retract lines between hydraulic fluid and an exterior of the working cylinder and an exterior of the cylinder rod.

5. The hydraulic jack of claim 4 further comprising an extend port positioned in the working cylinder.

6. The hydraulic jack of claim 5 further comprising a retract port positioned in the working cylinder.

7. The hydraulic jack of claim 6 further comprising an outer and inner mechanical tube to substantially contain and shield the working cylinder and facilitate attachment to a trailer.

8. The hydraulic jack of claim 4 further comprising a hydraulic power unit having an extend line and a retract line, the hydraulic power unit capable of producing a hydraulic pressure to provide hydraulic fluid flow through the extend line and the retract line.

9. A hydraulic jack comprising:

a working cylinder defining a body;

an extend port positioned in the working cylinder;

a retract port positioned in the working cylinder;

a cylinder rod engaged with the working cylinder to extend and retract relative to the body, wherein the cylinder rod comprises a foot configured to stabilize a trailer;

a housing configured to be attached to a trailer, the working cylinder installed within the housing, wherein the housing of the jack is coupled to the trailer by welding or bolting;

a valve body coupled to the working cylinder and positioned within the housing, the valve body being coupled by welding to the working cylinder and comprising a solid metal body with internal cavities formed by drilling therein;

further comprising a mounting pin for attaching the working cylinder to the housing of the jack, and wherein the valve body includes a fourth cavity configured to receive the mounting pin to secure the valve body to the housing of the jack;

a locking valve positioned in the working cylinder, the locking valve operable to allow substantially free hydraulic fluid flow out of the extend port when hydraulic pressure is present at a pilot port of the locking valve, and to substantially prevent hydraulic fluid flow out of the extend port when hydraulic pressure is not present at the pilot port of the locking valve;

an outer and inner mechanical tube to substantially contain and shield the working cylinder and facilitate attachment to a trailer.

10. The hydraulic jack of claim 9 further comprising a hydraulic power unit having an extend line and a retract line, the hydraulic power unit capable of producing a hydraulic pressure to provide hydraulic fluid flow through the extend line and the retract line.

11. The hydraulic jack of claim 10 wherein the working cylinder encapsulates the extend and retract lines between hydraulic fluid and an exterior of the working cylinder and an exterior of the cylinder rod.

12. A hydraulic jack comprising:

a working cylinder defining a body;

an extend port positioned in the working cylinder;

a retract port positioned in the working cylinder;

a cylinder rod engaged with the working cylinder to extend and retract relative to the body, wherein the cylinder rod comprises a foot configured to stabilize a trailer;

a housing configured to be attached to a trailer, the working cylinder installed within the housing, wherein the housing of the jack is coupled to the trailer by welding or bolting;

a valve body coupled to the working cylinder and positioned within the housing, the valve body being coupled by welding to the working cylinder and comprising a solid metal body with internal cavities formed by drilling therein;

further comprising a mounting pin for attaching the working cylinder to the housing of the jack, and wherein the valve body includes a fourth cavity configured to receive the mounting pin to secure the valve body to the housing of the jack;

a locking valve positioned in the working cylinder, the locking valve operable to allow hydraulic fluid to substantially flow free in a first direction into the extend port, and to substantially prevent the hydraulic fluid from flowing in a second direction out of the extend port when hydraulic pressure is not present at a pilot port of the locking valve, wherein the working cylinder encapsulates hydraulic lines between the hydraulic fluid and an exterior of the working cylinder and an exterior of the cylinder rod; and an outer and inner mechanical tube to substantially contain and shield the working cylinder and facilitate attachment to a trailer.

* * * * *